United States Patent [19]

Arzounian

[11] Patent Number: 4,845,774
[45] Date of Patent: Jul. 4, 1989

[54] APPARATUS FOR ANCHORING A TELEPHONE HANDSET TO A TELEPHONE HOUSING

[76] Inventor: Raymond Arzounian, 4332 Howland St., Philadelphia, Pa. 19124

[21] Appl. No.: 154,422

[22] Filed: Feb. 5, 1988

Related U.S. Application Data

[63] Continuation-in-part of Ser. No. 915,353, Oct. 6, 1986, abandoned.

[51] Int. Cl.⁴ .................. H04M 1/15; H04R 1/03; H04R 1/06
[52] U.S. Cl. .................. 379/433; 174/65 R; 379/438; 439/449
[58] Field of Search .............. 379/433, 428, 437, 438, 379/143, 155; 439/449; 174/65 R

[56] References Cited

U.S. PATENT DOCUMENTS

| | | | |
|---|---|---|---|
| 896,700 | 8/1908 | Atwood | 439/452 |
| 2,200,794 | 5/1940 | Krantz | 379/387 |
| 2,220,393 | 11/1940 | Bylander | 174/102 R |
| 2,367,298 | 1/1945 | McLarn | 379/433 |
| 2,795,641 | 6/1957 | Rowell | 174/135 |
| 3,235,674 | 2/1966 | Mirstam | 379/433 |
| 3,284,751 | 11/1966 | Barker et al. | 338/66 |
| 3,290,429 | 12/1966 | Prescott et al. | 174/102 R |
| 3,291,898 | 12/1966 | Sandell | 174/131 R |
| 3,377,422 | 4/1968 | Trimble et al. | 174/88 R |
| 3,384,393 | 6/1968 | Horton et al. | 174/65 R |
| 3,643,205 | 2/1972 | Elkins | 379/438 |
| 3,654,406 | 4/1972 | Reinthaler | 381/169 |
| 3,674,915 | 7/1972 | Pritchard | 174/102 R |
| 3,699,498 | 10/1972 | Hardesty et al. | 379/438 |
| 3,929,164 | 12/1975 | Richter | 138/120 |
| 4,079,190 | 3/1978 | Jones et al. | 174/102 R |
| 4,087,659 | 5/1978 | Boenecke | 379/433 |
| 4,130,740 | 12/1978 | Cogan | 379/433 |
| 4,259,544 | 3/1981 | Litauer | 174/102 R |
| 4,518,830 | 5/1985 | Drexler et al. | 379/438 |

FOREIGN PATENT DOCUMENTS

| | | |
|---|---|---|
| 1183549 | 3/1965 | Fed. Rep. of Germany . |
| 608909 | 1/1979 | Fed. Rep. of Germany . |
| 901602 | 11/1944 | France . |
| 1434716 | 6/1966 | France . |
| 319830 | 1/1970 | Sweden ............ 174/65 R |
| 974487 | 12/1964 | United Kingdom . |

Primary Examiner—Jin F. Ng
Assistant Examiner—Danita R. Byrd
Attorney, Agent, or Firm—Panitch, Schwarze, Jacobs and Nadel

[57] ABSTRACT

A shaped anchor member for anchoring a telephone handset to a telephone housing wherein a stranded cable is employed to mechanically connect the handset and the housing. An end portion of the stranded cable is disposed within the anchor member. The anchor member is provided with a top compound surface having first and second radii of curvature such that the compound surface is in substantially full surface contact with an interior surface of the handset at the junction of the handset yoke and receiver.

12 Claims, 4 Drawing Sheets

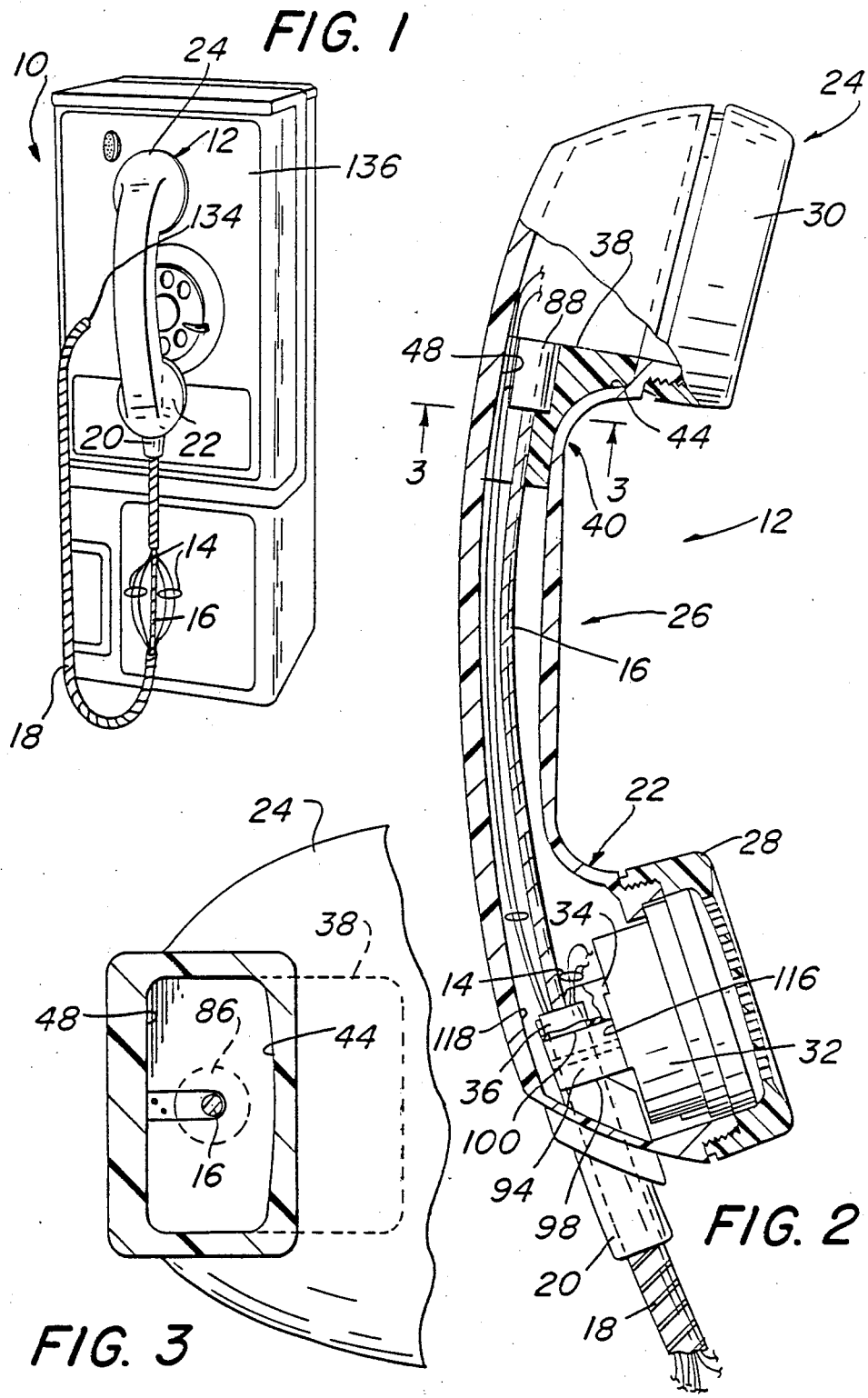

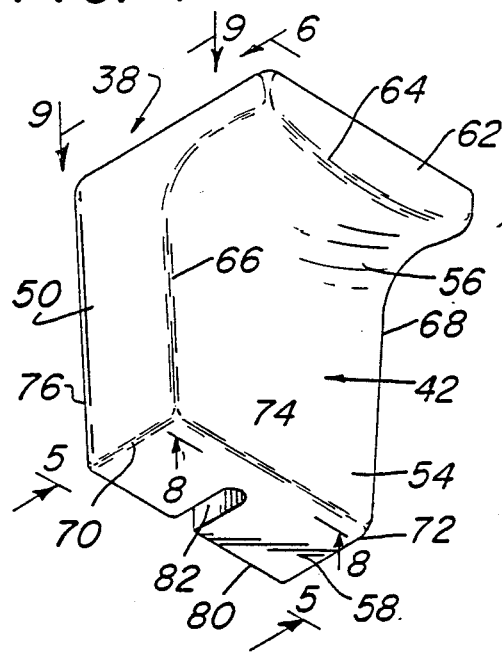
FIG. 4
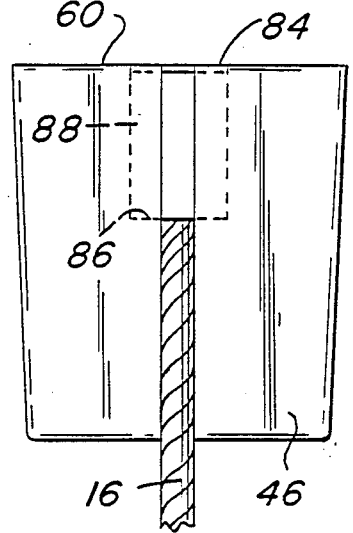
FIG. 5
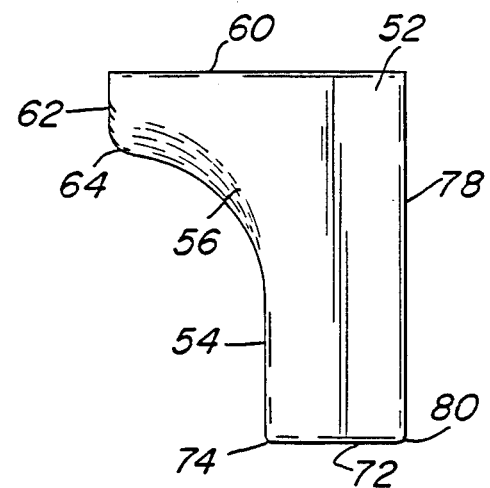
FIG. 6
FIG. 7

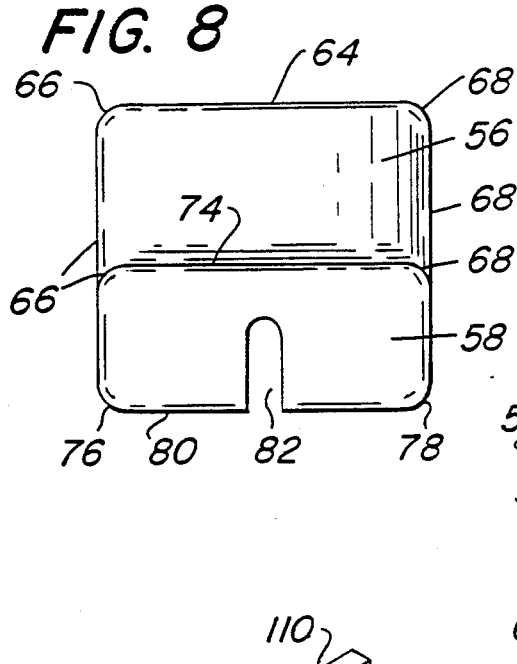
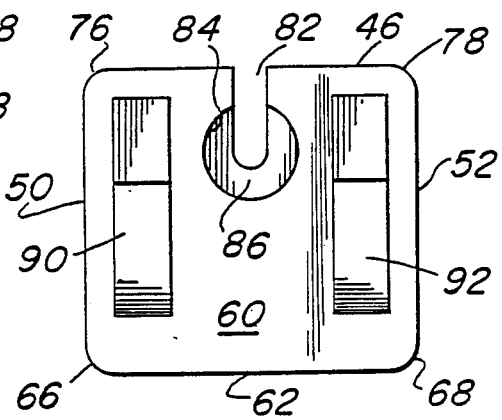
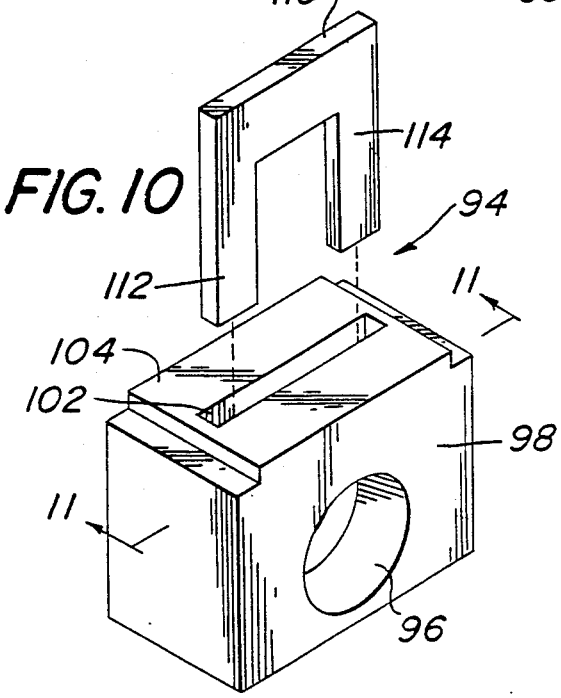
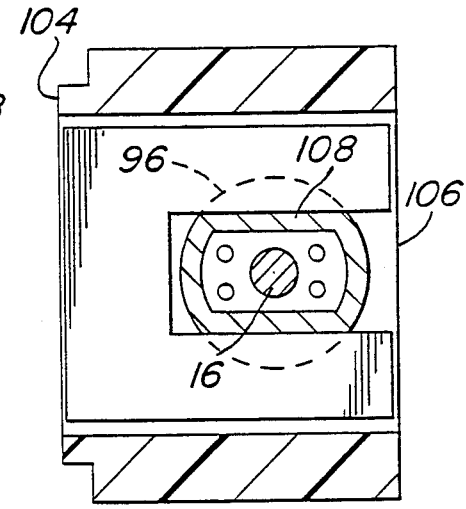

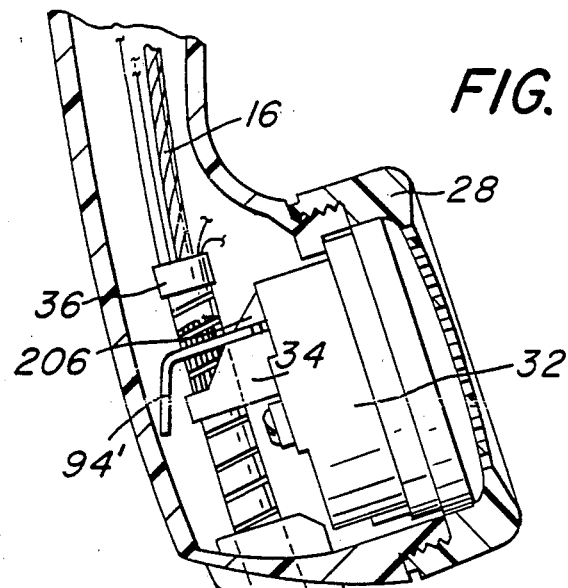
FIG. 15
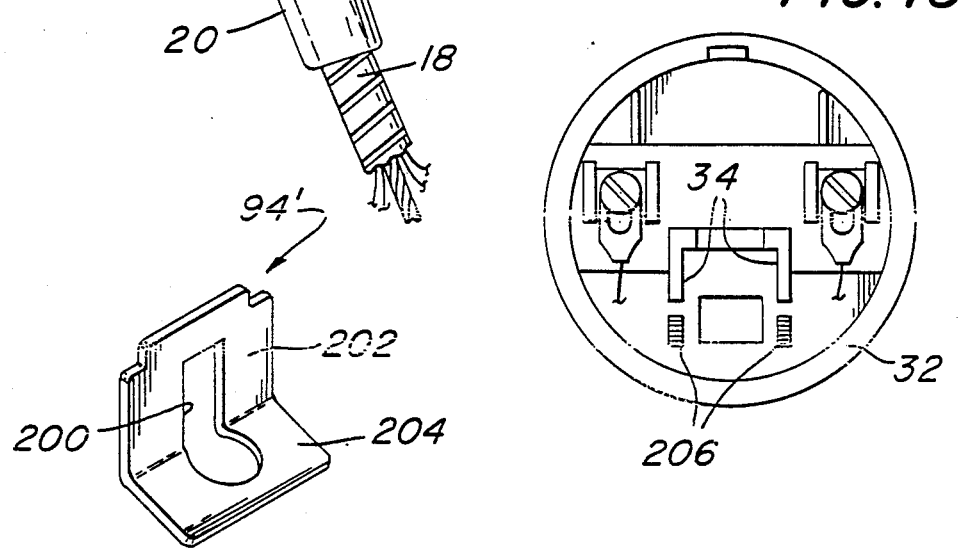
FIG. 18
FIG. 16
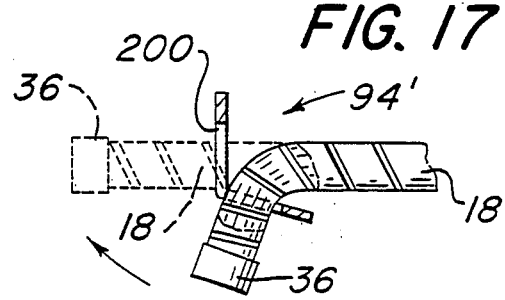
FIG. 17

APPARATUS FOR ANCHORING A TELEPHONE HANDSET TO A TELEPHONE HOUSING

This is a continuation-in-part of co-pending application Ser. No. 915,353 filed on Oct. 6, 1986 now abandoned.

BACKGROUND OF THE INVENTION

The present invention is directed to a system for anchoring a telephone handset to a telephone housing such as the housing for a public or "pay" telephone. Systems for anchoring handsets to such telephone housings are known. See U.S. Pat. No. 4,518,830 (Drexler et al). In such a system, a 3/32 inch diameter 7×19 stranded cable having a tensile strength of 800 pounds or more is used to mechanically connect the handset to the housing. The stranded cable is flexible and, together with the signal wires, is sheathed in flexible telephone cord armor ("tca") between the handset and the housing. An end portion of the tca extends within the handset through a grommet and the depending legs of the handset transmitter cup. The stranded cable extends through the yoke of the handset past the junction of the yoke and handset receiver portion. The end of the stranded cable is provided with an end plug or stop. The stranded cable is anchored at the yoke-receiver junction by a wedge-shaped anchor member. See FIGS. 9-11 of the patent. The bottom surface of the anchor member is flat and contacts a relatively flat interior surface of the handset. The top surface of the anchor member is also flat as are the side surfaces of the anchor member. The top surface of the anchor member is disposed at an acute angle with respect to its bottom surface, the two surfaces converging towards the yoke-receiver junction. The stranded cable extends through a slot formed in the bottom surface of the anchor member. The cable end stop is received in a bore in the rear surface of the anchor member. The bore and slot intersect at a shoulder which serves as a stop surface for the cable end stop. Because the top and side surfaces of the anchor member are flat, the surfaces intersect along relatively sharp edges. The interior surface of the handset which faces the top surface of the anchor member is not flat but, instead, comprises a compound surface at the yokereceiver junction. The compound surface is defined by two radii of curvature, one along the longitudinal axis of the handset and the other substantially perpendicular thereto along the width of the handset. The relatively sharp edges of the anchor member make "point" contact with the interior compound surface of the handset. As a result, when the handset is pulled away from the telephone housing, the stranded cable end stop contacts the anchor member shoulder, forcing the relatively sharp edges of the anchor member into "point" contact against the interior compound surface of the handset. At forces substantially less than 800 pounds, the anchor member edges tend to shear or slice through the interior surface of the handset thereby rupturing the handset wall at the yoke-receiver junction.

In the anchoring system employed in U.S. Pat. No. 4,518,830, the handset end of the tca is crimped so as to fit between the transmitter cup legs. The legs and an interior surface of the transmitter end of the handset retain the tca in position. If the spacing between the transmitter cup legs exceeds the outer diameter of the tca, they will not anchor the tca against longitudinal displacement. Thus, when the handset is pulled away from the telephone housing, the handset end of the tca is forced against the grommet. If the handset is pulled with sufficient force, the tca may be forced through and pulled out of the grommet. Likewise, the handset end of the tca may be pushed through the transmitter end of the handset into an acoustic foam block at the junction of the handset transmitter and yoke portions. One problem solved by the present invention is that of anchoring the stranded cable at the yoke-receiver junction of the handset without danger of rupture of the junction wall when forces up to the 800 pound tensile strength of the stranded cable are applied. Another problem solved by the present invention is that of anchoring the handset end of the tca against longitudinal and rotational displacement in the transmitter end of the handset.

The invention includes the discovery that rupture of the handset wall at the yoke-receiver junction is due to "point" contact between the relatively sharp edges of the conventional wedge-shaped anchor member and the compound interior surface of the handset at the yoke-receiver junction. The invention also includes recognition of the inability of the transmitter cup legs to reliably anchor the handset end of the tca in position against longitudinal and rotational displacement at the transmitter end of the handset.

In my invention, the anchor member is shaped so as to have a top compound surface matching the shape of the compound interior surface of the handset at the yoke-receiver junction such that full surface contact is maintained between the anchor member and the handset interior compound surface at the yoke-receiver junction. Such contact distributes the forces produced when the handset is pulled away from the telephone housing so that the forces cannot concentrate at a "point" or even along a "line" thereby preventing rupture of the handset wall at the junction. In addition, in my invention, the handset end of the tca is positively anchored against longitudinal and rotational displacement by a retainer member mounted on the tca and sandwiched between the grommet and transmitter cup legs.

Other advantages of the invention are described hereafter.

BRIEF DESCRIPTION OF THE DRAWINGS

FIG. 1 is an isometric of a public or "pay" telephone housing and a handset.

FIG. 2 is a partial section of the handset showing the tca retainer member and the cable anchor member.

FIG. 3 is a transverse section taken along 3—3 in FIG. 2 and showing the compound interior surface of the handset at the yoke-receiver junction.

FIG. 4 is an isometric of the cable anchor member showing the top compound surface.

FIG. 5 is a bottom plan view of the cable anchor member and cable taken along 5—5 of FIG. 4.

FIG. 6 is a top plan view of the cable anchor member showing the rounded edges bordering the top compound surface taken along 6—6 of FIG. 4.

FIG. 7 is a side elevation of the cable anchor member taken along 7—7 of FIG. 6.

FIG. 8 is a front elevation of the cable anchor member taken along 8—8 of FIG. 4.

FIG. 9 is a rear elevation of the cable anchor member taken along 9—9 of FIG. 4.

FIG. 10 is an isometric of the tca retainer member and U-clip.

FIG. 11 is a transverse section taken along 11—11 in FIG. 10 and showing the U-clip inserted over a swaged portion of the tca.

FIG. 15 is a partial section of the handset showing an alternative embodiment of the tca retainer member.

FIG. 16 is an isometric of the alternative embodiment of the tca retainer member.

FIG. 17 is a side elevation of the alternative embodiment of the tca retainer member.

FIG. 18 is a bottom plan view of the transmitter cup.

DETAILED DESCRIPTION OF INVENTION

Figure 12:
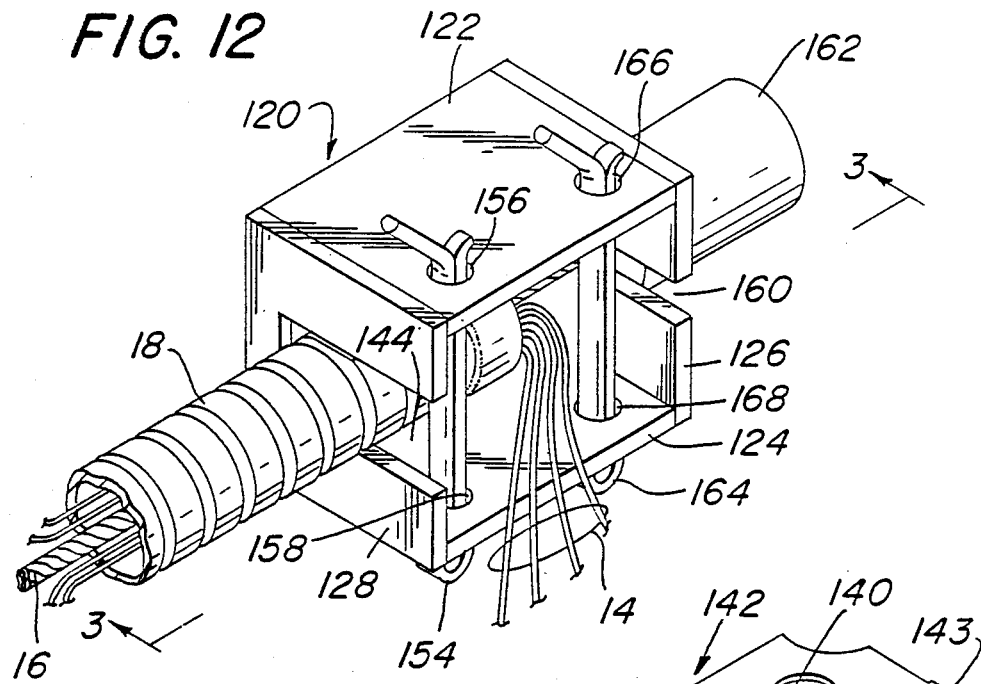
FIG. 12 is an isometric of the combined cable-tca retainer member with the telephone housing end of the tca and cable in place.
Figure 14:
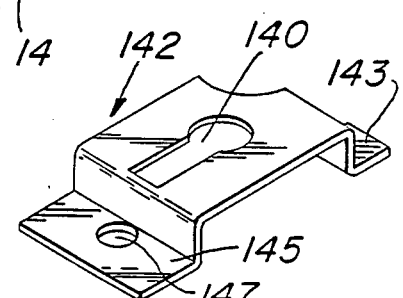
FIG. 14 is an isometric of the keeper plate.

Referring to the drawings, wherein like numerals indicate like elements, there is shown in FIG. 1 a telephone housing 10 of the public or "pay" type and a handset 12. The housing 10 and handset 12 are conventional structures. The telephone signal wires 14 and a stranded cable 16 are sheathed in tca 18 between the housing 10 and handset 12. The tca 18 extends through a grommet 20 secured to the transmitter end 22 of the handset. The tca 18 protects the signal wires 14 and cable 16 from vandalism.

The system for anchoring the cable 16 and tca 18 in handset 12 according to the present invention is best shown in FIG. 2. The handset 12 includes a receiver end or portion 24 and a yoke 26 connecting the transmitter and receiver ends 22, 24. The handset 12 is a conventional one-piece structure provided with screw caps 28, 30 at the transmitter and receiver ends respectively. The tca extends through grommet 20 below the transmitter cup 32 through the transmitter cup legs 34. A ferrule 36 is secured in conventional manner to the end of the tca. The ferrule is provided with an opening allowing for passage of the cable 16 and signal wires 14.

The cable 16 is anchored in the handset 12 by means of a cable anchor member 38 which is inserted in the handset at the yoke-receiver junction. The junction is generally indicated by 40 in FIG. 2. The top surface 42 of the anchor member 38 includes a generally concavo-convex surface which "matches" the convex-concave interior surface 44 of the handset at the yoke-receiver junction 40 as shown in FIGS. 3–8.

The cable anchor member 38 and yoke-receiver junction 40 are best shown in FIGS. 3–8. The bottom surface 46 of the cable anchor member is substantially flat, and it contacts a substantially flat interior surface 48 of the handset at the yoke-receiver junction 40. Thus, the top compound surface 42 and flat bottom surface 46 of the cable anchor member contact the handset interior surfaces 44, 48 at the yoke-receiver junction so as to maintain full surface contact between the cable anchor member and the interior surfaces 44, 48 of the handset. The side surfaces 50, 52 of the cable anchor member are substantially flat. Preferably, the side surfaces converge towards the transmitter end 22 of the handset with a slight taper such as 3° so as to provide pilot surfaces facilitating placement of the cable anchor member 38 in the yoke-receiver junction 40.

Preferred dimensions of the cable anchor member 38 are as follows. The top compound surface 42 includes a lower, relatively flat surface portion 54 which leads into a concavo-convex surface portion 56 having a $\frac{1}{2}$ inch radius of curvature along the direction of the longitudinal axis L of the handset and a $1\frac{1}{8}$ inch radius of curvature along a direction transverse and substantially perpendicular to the longitudinal axis of the handset. The cable anchor member is provided with a substantially flat front surface 58 and a substantially flat rear surface 60. The distance between the front and rear surfaces 58, 60 is $1\frac{1}{4}$ inch. The width of the front surface is 1.060 inch. The width of the rear surface 60 is 1.125 inch. The concavo-convex portion 56 leads into an upper, substantially flat surface portion 62 along an arcuate rounded edge 64. Edge 64 is defined by an arc running transverse to the longitudinal axis of the anchor member with a radius of curvature of $1\frac{1}{8}$ inch. The edge is rounded with a radius of curvature of 3/32 inch. The surfaces 54, 56 and 62 intersect the side surfaces 50, 52 along rounded edges 66, 68 each having a radius of curvature of 3/32 inch. The front surface 58 intersects the side surfaces 50, 52 along straight, rounded edges 70, 72 each having a radius of curvature of 3/32 inch. The front surface 58 intersects the lower surface portion 54 along a straight, rounded edge 74 having a radius of curvature of 1/16 inch. The side surfaces 50, 52 intersect bottom surface 46 along straight, rounded edges 76, 78 each having a radius of curvature of 3/32 inch. The bottom surface 46 intersects the front surface 58 along a straight, rounded edge 80 having a radius of curvature of 1/16 inch. A slot 82 is formed in the bottom surface 46 parallel to the longitudinal axis of the anchor member to accommodate the cable 16. A circular bore or passage 84 is formed in the rear surface 60. The passage 84 intersects the slot 82 so as to define a shoulder 86 which serves as a stop surface for an end stop or plug 88 secured to the end of cable 16. Cavities 90, 92 may be formed between passage 84 and the side surfaces 50, 52 so as to make the anchor member lightweight.

The cable anchor member 38 is formed of a hard, polymeric plastic material such as ABS. By rounding the intersecting edges of the cable anchor member surfaces, and by forming the top compound surfaces of the anchor member as described, "point" or "line" contact between the anchor member and the interior surfaces of the handset at the yoke-receiver junction are avoided. Accordingly, when the handset is pulled away from the telephone housing 10, end stop 88 seats in passage 84 against shoulder 86, and all forces are distributed over an area of full surface contact between the cable anchor member and the interior surface of the handset. As a result, rupture of the handset wall at the yoke-receiver junction will not occur even at forces which are commensurate with the 800 pound tensile strength of cable 16.

The tca 18 is anchored in the transmitter end 22 of handset 12 by a retainer member 94. The tca retainer member 94 is best shown in FIGS. 10 and 11. The retainer member 94 is a block of hard, polymeric plastic material having a through-bore or passage 96 extending from a front face 98 to a rear face 100 (FIG. 2). The retainer member is also provided with a slot 102 extending from a top face 104 to a bottom face 106 and intersecting the passage 96. The diameter of the passage 96 is slightly greater than the outer diameter of ferrule 36 so that the tca 18 and ferrule 36 can freely slide through the passage. An end portion 108 of the tca 18 proximate ferrule 36 is swaged. A metallic, generally U-shaped clip 110 is inserted in slot 102 such that the clip legs 112, 114 at least partially protrude within the passage 96. The spacing between the clip legs 112, 114 is less than the outer diameter of the tca so that the legs fit over the swaged end portion 108 of the tca thereby preventing any appreciable longitudinal or rotational displacement of the tca within passage 96. Thus, the tca 18 is locked in the retainer member 94.

The retainer member 94 itself is anchored in position against longitudinal and rotational displacement by the grommet 20, the bottom surface 116 of the transmitter cup 32, the transmitter cup legs 34 and the bottom interior surface 118 of the transmitter end 22 of the handset. Thus, when screw cap 28 is secured to the handset 12, transmitter cup 32 and the bottom interior surface 118 of the transmitter end 22 of the handset prevent rotational displacement of the retainer member 94 hence rotational displacement of the tca 18 about its longitudinal axis. Also, if the tca is pushed into the transmitter end 22 of the handset, the transmitter cup legs 34 provide a stop surface which is contacted by the rear face 100 of the retainer member 94 thereby preventing longitudinal displacement of the retainer member hence longitudinal displacement of the tca. And if the tca 18 is pulled away from the transmitter end 22 of the handset, the grommet 20 provides a stop surface which is contacted by the front face 98 of the retainer member 94 thereby preventing longitudinal displacement of the retainer member hence longitudinal displacement of the tca. Accordingly, the tca 18 can neither be pushed through the transmitter end 22 to the yoke 26 of the handset nor pulled from the transmitter end 22 through the grommet 20.

Figure 13:
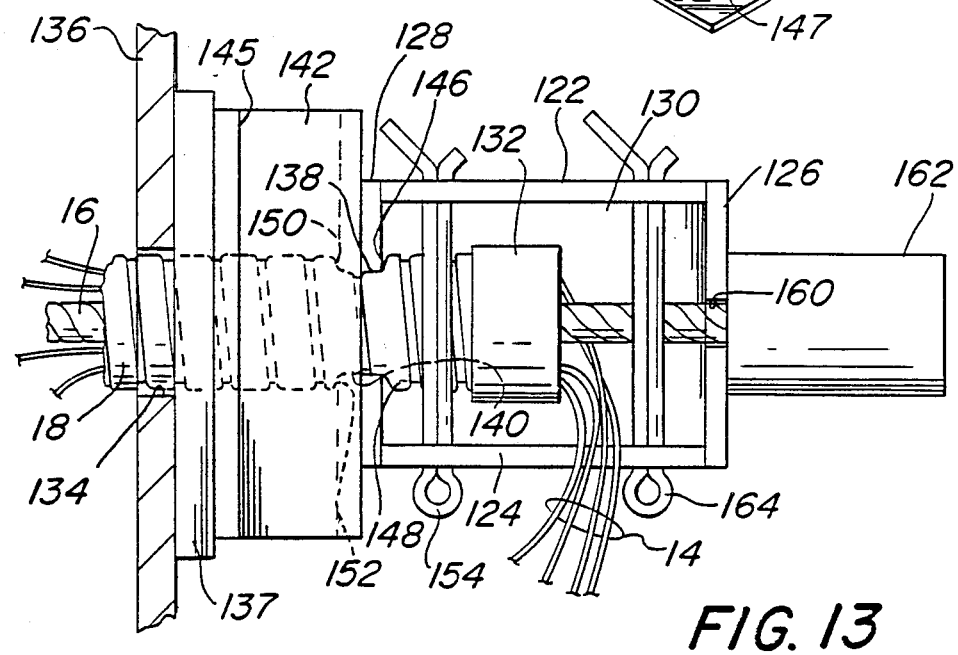
FIG. 13 is a side elevation of the combined cable-tca retainer member taken along 13—13 in FIG. 12 showing the member secured to a keeper plate inside the telephone housing.

The tca 18 is anchored in the telephone housing 10 by means of a combined cable-tca retainer member 120. The cable-tca retainer member 120 is best shown in FIGS. 12 and 13. Retainer member 120 is a five sided, hollow rigid metallic block having side walls 122, 124, slotted top and bottom walls 126, 128 and a rear wall 130. A ferrule 132 is secured to the telephone housing end of the tca 18 and is provided with a passage through which the signal wires 14 and the cable 16 extend. The telephone housing end of the tca 18 is inserted through a circular opening 134 in a wall 136 of the telephone housing 10. The telephone housing end portion of the tca 18 is swaged as at 138. Swaged portion 138 of the tca is located in a slot 140 formed in a keeper plate 142 which is screw fastened to a conventional mounting block 137 secured to wall 136 inside the telephone housing. The keeper plate 142 has an ear 143 which is captured in a portion of the mounting block and a flange 145 provided with a screw hole 147. The swaged portion 138 of the tca also extends through a slot 144 in the bottom wall 128 of the retainer member 120. The keeper plate 142 and bottom wall 128 of the retainer member provide stop surfaces which contact shoulders 146, 148 and 150, 152 at the swaged portion 138 of the tca thereby preventing longitudinal displacement of the tca. Thus, the tca cannot be pushed into or pulled from the telephone housing 10. In addition, the keeper slot 140 and the bottom wall slot 144 of the retainer member have identical widths which permit insertion of the swaged portion 138 of the tca with only slight clearance such that the keeper plate 142 and bottom wall 128 prevent rotational displacement of the tca about its longitudinal axis. The end portion of the tca including ferrule 132 is prevented from sliding out of the bottom wall slot 144 by a cotter pin 154 which extends through aligned openings 156, 158 in side walls 122, 124.

The telephone housing end of the cable 16 extends through a slot 160 in the top wall 126 of the retainer member 120. The top wall 126 provides a stop surface for an end stop or plug 162 secured to the cable 16. The cable 16 is retained in slot 160 by a cotter pin 164 which extends through aligned openings 166, 168 in side walls 122, 124. Thus, the retainer member 120 serves to anchor both the tca 18 and cable 16 within the telephone housing 10.

Referring to FIG. 15, there is shown an alternative embodiment of the tca retainer member designated 94'. The tca retainer member 94' is best shown in FIGS. 16 and 17. The retainer member 94' is a rigid, generally L-shaped metal clip having a slot 200 extending from an upper leg 202 to a lower leg 204. The portion of slot 200 in leg 202 is generally elongated and has a width slightly greater than the width of the swaged end portion 108 of the tca 18. The portion of slot 200 in leg 204 is in the shape of a partial circle having a diameter which is greater than the width of the portion of slot 200 in leg 202. The diameter of the portion of the slot in leg 204 is slightly greater than the outer diameter of the ferrule 36 so that the ferrule end of the tca 18 may be inserted through the portion of the leg 204 as shown in solid lines in FIG. 17. The tca 18 can then be displaced upwardly through the portion of slot 200 in leg 202, as shown in FIG. 17, along the swaged end portion 108 thereof. The edges of the slot 200 in leg 202 will then prevent longitudinal and rotational displacement of the tca.

Figure 21:
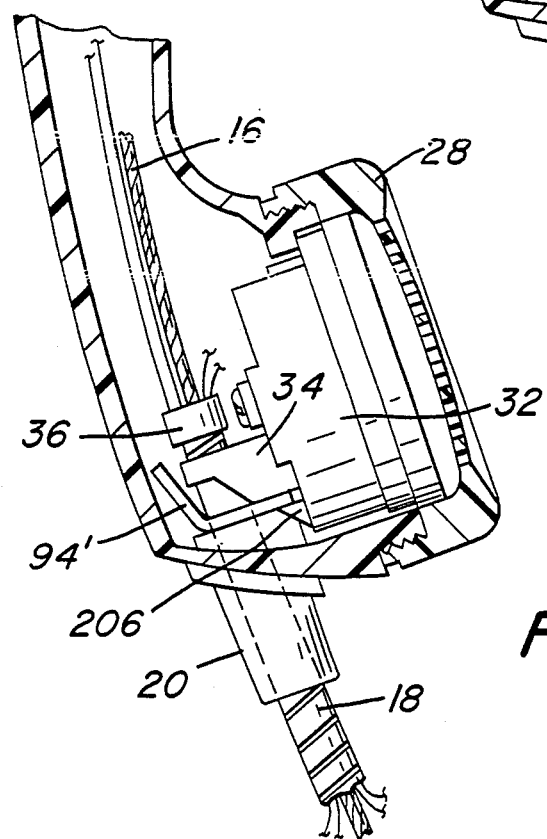
FIG. 21 is a partial section of the handset showing the tca retainer member and transmitter cup of FIG. 15 rotated 180°.

As shown in FIG. 15, the tca retainer member 94' is captured by inserting the clip leg 202 in the gap between the transmitter cup legs 34 and 206. Preferably, the thickness of leg 202 is chosen to ensure that the leg is captured by frictional engagement with the transmitter legs 34, 206. As shown in FIG. 21, the transmitter cup 32 and retainer clip 94' may be rotated 180° so as to capture leg 202 between transmitter legs 34, 206 and against the grommet 20.

Although the system of the present invention has been described in terms of a cable anchor member 38, tca retainer member 94 (or 94') and combined cable-tca retainer member 120, and it is preferred that all such elements be used in combination, the elements may also be used independently of each other. Thus, the cable anchor member 38 anchors the cable 16 at the yoke-receiver junction of the handset 12 while the tca retainer member 94 (or 94') anchors the tca at the transmitter end 22 of the handset 12. Although the cable 16 is sheathed in the tca 18 between the telephone housing 10 and the handset 12, the cable and tca are not mechanically connected, and they are separately anchored in the handset. Similarly, although the combined cable-tca retainer member 120 serves to anchor both the tca 18 and cable 16 at the telephone housing 10, the tca and cable are separately anchored by the top and bottom walls 126, 128 of retainer member 120.

Although the invention has been described in connection with a handset 12 having screw caps 28, 30, it should be understood that in public or "pay" telephone systems of this type the caps are welded or otherwise secured to the handset so that the caps cannot be removed from the handset.

Also, although the cable anchor member 38 has been described as being inserted in the yoke-receiver junction 40 of the handset 12, so that the anchor member interacts with the interior surfaces of the handset at the yoke-receiver junction so as to provide a stop surface for the cable end stop 88 when the handset is pulled away from the telephone housing 10, the anchoring action may be further improved by welding the cable anchor member 38 to the interior surfaces of the handset at the yoke-receiver junction. Thus, the cable anchor member 38 may be ultrasonically welded to the interior surfaces of the handset at the yoke-receiver junction so as to provide a unified body of increased strength. It should be understood, however, that whether the cable anchor member 38 is welded to the interior surfaces of the handset or not, the anchor member 38 prevents rupture of the handset wall at the yoke-receiver junction despite the application of forces up to the 800 pound tensile strength of the cable 16 itself.

Further, although the cable anchor member 38 has been described in connection with a concavo-convex surface having particular radii of curvature, it should be understood that the shape of the surfaces of the cable anchor member are generally chosen to match the shape of the interior surface of the handset at the yoke-receiver junction to ensure optimal surface contact between the anchor member and handset.

Figure 19:
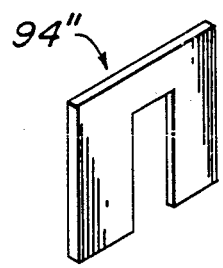
FIG. 19 is an isometric of a further alternative embodiment of the tca retainer member.
Figure 20:
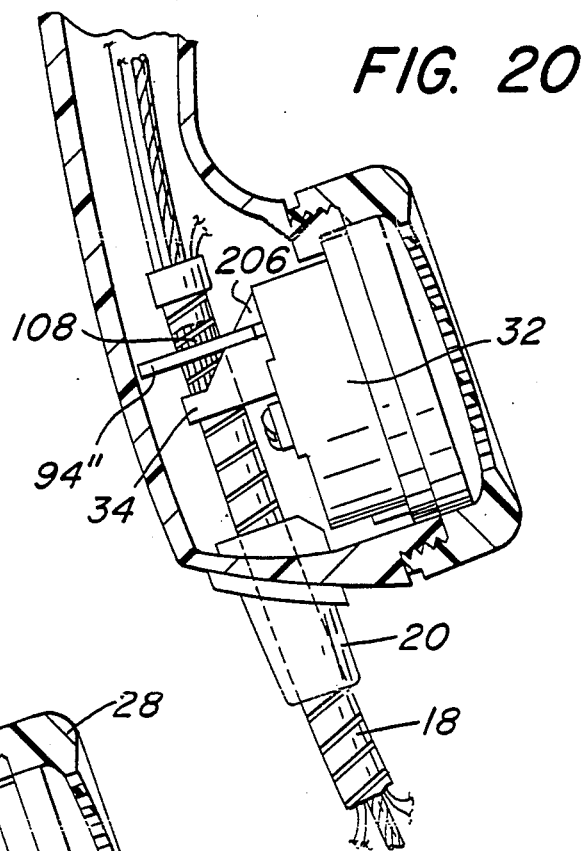
FIG. 20 is a partial section of the handset showing the tca retainer member of FIG. 19.

Although an alternative embodiment of the tca retainer member 94' has been described as a generally L-shaped clip having legs 202, 204, it should be apparent that leg 204 can be dispensed with whereby the leg 202 would be generally U-shaped around the slot 200, similar in shape to clip 110 in FIG. 10. Such a retainer clip, designated 94'', is shown in FIGS. 19 and 20. The transmitter cup 32 and retainer clip 94'' may be rotated 180° so as to place the clip 94'' against the grommet 20 in the manner previously explained in connection with retainer clip 94' and FIG. 21.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for anchoring a telephone handset to a telephone housing, the handset having a hollow yoke portion joined to a hollow receiver portion, comprising:
   a cable and an end stop member secured thereto,
   a shaped anchor member provided with a top compound surface having a first radius of curvature substantially identical to the radius of curvature of an interior surface of the handset at the junction of the handset yoke and receiver portions along the longitudinal axis of the handset and a second radius of curvature substantially identical to the radius of curvature of the interior surface of the handset at said junction along a direction transverse to the longitudinal axis of the handset,
   said shaped anchor member having side surfaces, a bottom surface, and front and rear surfaces, said front, bottom and rear surfaces being provided with a slot for receiving said cable, said rear surface being provided with an opening intersecting said slot for receiving said end stop member, and
   said shaped anchor member being insertable within said handset at said junction such that said top compound surface is in substantially full surface contact with said handset interior surface.

2. Apparatus for anchoring a telephone handset to a telephone housing, the handset having a hollow yoke portion joined to a hollow receiver portion, comprising:
   a cable and an end stop member secured thereto,
   a shaped anchor member provided with a top compound surface having a first radius of curvature substantially identical to the radius of curvature of an interior surface of the handset at the junction of the handset yoke and receiver portions along the longitudinal axis of the handset and a second radius of curvature substantially identical to the radius of curvature of the interior surface of the handset at said junction along a direction transverse to the longitudinal axis of the handset,
   said shaped anchor member having side surfaces, a bottom surface, and front and rear surfaces, said front, bottom and rear surfaces being provided with a slot for receiving said cable, said rear surface being provided with an opening intersecting said slot for receiving said end stop member,
   said shaped anchor member being insertable within said handset at said junction such that said top compound surface is in substantially full surface contact with said handset interior surface, and
   each of said shaped anchor member side surfaces meeting said top compound surface along a rounded edge and said anchor member front surface meeting each of said side surfaces and said top compound surface along a rounded edge.

3. Apparatus for anchoring a telephone handset to a telephone housing, the handset having a hollow yoke portion joined to a hollow receiver portion, and a transmitter cup disposed within said transmitter portion and having a member depending therefrom, comprising:
   telephone cord armor having a swaged end portion,
   a cable at least partially disposed within said telephone cord armor and an end stop member secured to said cable,
   a shaped anchor member provided with a top compound surface having a first radius of curvature substantially identical to the radius of curvature of an interior surface of the handset at the junction of the handset yoke and receiver portions along the longitudinal axis of the handset and a second radius of curvature substantially identical to the radius of curvature of said interior surface of the handset at said junction along a direction transverse to the longitudinal axis of the handset,
   said shaped anchor member having side surfaces, a bottom surface, and front and rear surfaces, said front, bottom and rear surfaces being provided with a slot for receiving said cable, said rear surface being provided with an opening intersecting said slot for receiving said end stop member,
   said shaped anchor member being insertable within said handset at said junction such that said top compound surface is in substantially full surface contact with said handset interior surface,
   a telephone cord armor retainer member adapted to be mounted on the swaged end portion of the telephone cord armor, said telephone cord armor retainer member having a passage through which the telephone cord armor can extend and a slot intersecting the passage, and a retainer clip adapted to be disposed within the retainer member slot such that said clip at least partially protrudes within said passage to interfere with said swaged telephone cord armor end portion thereby preventing longitudinal displacement of said telephone cord armor with respect to said telephone cord armor retainer member.

4. Apparatus for anchoring a telephone handset to a telephone housing, the handset having a hollow yoke portion joined to a hollow receiver portion at one end and to a hollow transmitter portion at another end, the transmitter portion having an opening for receiving an end portion of the telephone cord armor, comprising:

telephone cord armor having a swaged telephone housing end portion and a swaged handset end portion, cable at least partially disposed within said telephone cord armor and having a stop member secured to a handset end portion of the cable and another stop member secured to a telephone housing end portion of the cable, a shaped anchor member provided with a top compound surface having a first radius of curvature substantially identical to the radius of curvature of an interior surface of the handset at the junction of said handset yoke and receiver portions along the longitudinal axis of the handset and a second radius of curvature substantially identical to the radius of curvature of said interior surface of the handset at said junction along a direction transverse to the longitudinal axis of the handset, said shaped anchor member having side surfaces, a bottom surface, and front and rear surfaces, said front, bottom and rear surfaces being provided with a slot for receiving said cable, said rear surface being provided with an opening intersecting said slot for receiving said end stop member at said handset end portion of the cable, said shaped anchor member being insertable within said handset at said junction such that said top compound surface is in substantially full surface contact with said handset interior surface, and a telephone cord armor-cable retainer member adapted to be mounted on the swaged telephone housing end portion of the telephone cord armor and including a first wall having a slot extending to an edge thereof for receiving said swaged telephone housing end portion of the telephone cord armor, a second wall having a slot extending to an edge thereof for receiving said telephone housing end portion of the cable, said second wall defining a stop surface for said stop member which is secured to the telephone housing end portion of the cable, and means for retaining said telephone housing end portion of said telephone cord armor and said telephone housing end portion of said cable within said telephone cord armor-cable retainer member.

5. Apparatus for anchoring a telephone handset to a telephone-housing, the handset having a hollow yoke portion joined to a hollow receiver portion at one end and to a hollow transmitter protion at another end, the transmitter portion having an opening for receiving an end portion of the telephone cord armor, comprising:

telephone cord armor having a swaged telephone housing end portion and a swaged handset end portion, a cable at least partially disposed within said telephone cord armor and having a stop member secured to a handset end portion of the cable and another stop member secured to a telephone housing end portion of the cable, a shaped anchor member provided with a top compound surface having a first radius of curvature substantially identical to the radius of curvature of an interior surface of the handset at the junction of said handset yoke and receiver portions along the longitudinal axis of the handset and a second radius of curvature substantially identical to the radius of curvature of said interior surface of the handset at said junction along a direction transverse to the longitudinal axis of the handset, said shaped anchor member having side surfaces, a bottom surface, and front and rear surfaces, said front, bottom and rear surfaces being provided with a slot for receiving said cable, said rear surface being provided with an opening intersecting said slot for receiving said end stop member at said handset end portion of the cable, said shaped anchor member being insertable within said housing at said junction such that said top compound surface is in substantially full surface contact with said handset interior surface, a telephone cord armor retainer member adapted to be mounted on the swaged handset end portion of the telephone cord armor, said telephone cord armor retainer member having a passage through which the telephone cord armor can extend and a slot intersecting the passage, a retainer clip adapted to be disposed within the retainer member slot such that said clip at least partially protrudes within said passage to interfere with said swaged handset end portion of said telephone cord armor thereby preventing longitudinal displacement of said telephone cord armor with respect to said telephone cord armor retainer member, a telephone cord armor-cable retainer member adapted to be mounted on the swaged telephone housing end portion of the telephone cord armor and including a first wall having a slot extending to an edge thereof for receiving said swaged telephone housing end portion of the telephone cord armor, a second wall having a slot extending to an edge thereof for receiving said telephone housing end portion of the cable, said second wall defining a stop surface for said stop member which is secured to the telephone housing end portion of the cable, and means for retaining said telephone housing end portion of said telephone cord armor and said telephone housing end portion of said cable within said telephone cord armor-cable retainer member.

6. Apparatus for anchoring a telephone handset to a telephone housing, comprising:

a handset having a hollow yoke portion joined to a hollow receiver portion, a cable and an end stop member secured thereto, a shaped anchor member provided with a top compound surface having a first radius of curvature substantially identical to the radius of curvature of an interior surface of the handset at the junction of the handset yoke and receiver portions along the longitudinal axis of the handset and a second radius of curvature substantially identical to the radius of curvature of said interior surface of the handset at said junction along a direction transverse to the longitudinal axis of the handset, said shaped anchor member having side surfaces, a bottom surface, and front and rear surfaces, said front, bottom and rear surfaces being provided with a slot for receiving said cable, said rear surface being provided with an opening intersecting said slot for receiving said end stop member, and said shaped anchor member being disposed within said handset at said junction such that said top compound surface is in substantially full surface contact with said handset interior surface.

7. Apparatus for anchoring a telephone handset to a telephone housing, comprising:

telephone cord armor having a swaged end portion, a handset having a transmitter portion provided with an opening for receiving said telephone cord armor, and a transmitter cup disposed within said transmitter portion, said transmitter cup having a member depending therefrom, a grommet secured to the handset at the handset transmitter portion opening, said grommet having an opening through which the telephone cord armor extends, a telephone cord armor retainer member mounted on said telephone cord armor within the handset transmitter portion, said telephone cord armor retainer member having a passage through which the telephone cord armor extends and a slot intersecting the passage, a retainer clip disposed within the retainer member slot such that said clip at least partially protrudes within said passage to interfere with said swaged telephone cord armor end portion thereby preventing rotational and longitutional displacement of said telephone cord armor with respect to said retainer member, and said telephone cord armor retainer member being disposed between and proximate to said grommet and said transmitter cup depending member whereby said grommet and transmitter cup depending member limit longitudinal displacement of said telephone cord armor retainer member.

8. Apparatus for anchoring a telephone handset to a telephone housing, comprising:

telephone cord armor having a swaged end portion, a handset having a hollow yoke portion joined to a hollow receiver portion, and a transmitter portion provided with an opening for receiving said telephone cord armor, and a transmitter cup disposed within said transmitter portion and having a member depending therefrom, a cable at least partially disposed within said telephone cord armor and having an end stop member secured thereto, a shaped anchor member provided with a top compound surface having a first radius of curvature substantially identical to the radius of curvature of an interior surface of the handset at the junction of said handset yoke and receiver portions along the longitudinal axis of the handset and a second radius of curvature substantially identical to the radius of curvature of said interior surface of the handset at said junction along a direction transverse to the longitudinal axis of the handset, said shaped anchor member having side surfaces, a bottom surface, and front and rear surfaces, said front, bottom and rear surfaces being provided with a slot for receiving said cable, said rear surface being provided with an opening intersecting said slot for receiving said end stop member, said shaped anchor member being disposed within said handset at said junction such that said top compound surface is in substantially full surface contact with said handset interior surface, a grommet secured to the handset at the handset transmitter portion opening, said grommet having an opening through which the telephone cord armor extends, a telephone cord armor retainer member mounted on the telephone cord armor within the handset transmitter portion, said telephone cord armor retainer member having a passage through which the telephone cord armor extends and a slot intersecting the passage, and a retainer clip disposed within the retainer member slot such that said clip at least partially protrudes within said passage to interfere with said swaged telephone cord armor end portion thereby preventing longitudinal displacement of said telephone cord armor with respect to said telephone cord armor retainer member.

9. Apparatus for anchoring a telephone handset to a telephone housing, comprising:

telephone cord armor having a swaged telephone housing end portion and a swaged handset end portion, a cable at least partially disposed within said telephone cord armor and having a stop member secured to a handset end portion of the cable and another stop member secured to a telephone housing end portion of the cable, a handset having a hollow yoke portion joined to a hollow receiver portion at one end and to a hollow transmitter portion at another end, the transmitter portion having an opening for receiving the handset end of the telephone cord armor, a shaped anchor member provided with a top compound surface having a first radius of curvature substantially identical to the radius of curvature of an interior surface of the handset at the junction of said handset yoke and receiver portions along the longitudinal axis of the handset and a second radius of curvature substantially identical to the radius of curvature of said interior surface of the handset at said junction along a direction transverse to the longitudinal axis of the handset, said shaped anchor member having side surfaces, a bottom surface, and front and rear surfaces, said front, bottom and rear surfaces being provided with a slot for receiving said cable, said rear surface being provided with an opening intersecting said slot for receiving said end stop member which is secured to the handset end portion of the cable, said shaped anchor member being disposed within said handset at said junction such that said top compound surface is in substantially full surface contact with said handset interior surface, and a telephone cord armor-cable retainer member mounted on the swaged telephone housing end portion of the telephone cord armor and including a first wall having a slot extending to an edge thereof for receiving said swaged telephone housing end portion of the telephone cord armor, a second wall having a slot extending to an edge thereof for receiving said telephone housing end portion of the cable, said second wall defining a stop surface for said stop member which is secured to the telephone housing end portion of said cable, and means for retaining said telephone housing end portion of said telephone cord armor and said telephone housing end portion of said cable within said telephone cord armor-cable retainer member.

10. Apparatus for anchoring a telephone handset to a telephone housing, comprising:

telephone cord armor having a swaged telephone housing end portion and a swaged handset end portion, a cable at least partially disposed within said telephone cord armor and having a stop member secured to a handset end portion of the cable and another stop member secured to a telephone housing end portion of the cable, a handset having a hollow yoke portion joined to a hollow receiver portion at one end and to a hollow transmitter portion at another end, the transmitter portion having an opening for receiving the handset end of the telephone cord armor, a shaped anchor member provided with a top compound surface having a first radius of curvature substantially identical to the radius of curvature of an interior surface of the handset at the junction of said handset yoke and receiver portions along the longitudinal axis of the handset and a second radius of curvature substantially identical to the radius of curvature of said interior surface of the handset at said junction along a direction transverse to the longitudinal axis of the handset, said shaped anchor member having side surfaces, a bottom surface, and front and rear surfaces, said front, bottom and rear surfaces being provided with a slot for receiving said cable, said rear surface being provided with an opening intersecting said slot for receiving said end stop member which is secured to the handset end portion of the cable, said shaped anchor member being disposed within said handset at said junction such that said top compound surface is in substantially full surface contact with said handset interior surface, a grommet secured to the handset at the handset transmitter portion opening, said grommet having an opening through which the telephone cord armor extends, a telephone cord armor retainer member mounted on the telephone cord armor within the handset transmitter portion, said telephone cord armor retainer member having a passage through which said telephone cord armor extends and a slot intersecting the passage, a retainer clip disposed within the retainer member slot such that said clip at least partially protrudes within said passage to interfere with said swaged handset end portion of said telephone cord armor thereby preventing longitudinal displacement of said telephone cord armor with respect to said telephone cord armor retainer member, and a telephone cord armor-cable retainer member mounted on the swaged telephone housing end portion of the telephone cord armor and including a first wall having a slot extending to an edge thereof for receiving said swaged telephone housing end portion of the telephone cord armor, a second wall having a slot extending to an edge thereof for receiving said telephone housing end portion of the cable, said second wall defining a stop surface for said stop member which is secured to the telephone housing end portion of said cable, and means for retaining said telephone housing end portion of said telephone cord armor and said telephone housing end portion of said cable within said telephone cord armor-cable retainer member.

11. Apparatus according to any one of claims 6, 8, 9 or 10 wherein said anchor member is ultrasonically welded to the handset such that said anchor member top compound surface and said handset interior surface are united.

12. Apparatus for anchoring a telephone handset to a telephone housing, the handset having a transmitter portion provided with an opening for receiving telephone cord armor, comprising:

telephone cord armor having a swaged end portion, a telephone cord armor retainer member comprising front and rear walls and a passage extending therebetween for receiving telephone cord armor and top and bottom walls and a slot extending therebetween and intersecting said passage, and a retainer clip adapted to be slidably inserted within the retainer member slot such that said clip at least partially protrudes within said passage to interfere with said swaged telephone cord armor end portion thereby preventing longitudinal displacement of said telephone cord armor with respect to said telephone cord armor retainer member.

* * * * *